(12) United States Patent
Partington et al.

(10) Patent No.: US 6,395,421 B1
(45) Date of Patent: May 28, 2002

(54) BATTERY

(75) Inventors: Kenneth Michael Partington, Longridge; John Haydon Watters; Ian Kenneth Clements, both of Manchester, all of (GB)

(73) Assignee: Chloride Industrial Batteries Limited, London (GB)

( * ) Notice: Subject to any disclaimer, the term of this patent is extended or adjusted under 35 U.S.C. 154(b) by 0 days.

(21) Appl. No.: 09/268,294

(22) Filed: Mar. 15, 1999

(30) Foreign Application Priority Data

Mar. 19, 1998 (GB) .............................. 9805817

(51) Int. Cl.[7] .......................... H01M 2/08; H01M 2/00
(52) U.S. Cl. ...................... 429/185; 429/163; 429/174; 429/175
(58) Field of Search ................ 429/163, 175, 429/174, 185

(56) References Cited

U.S. PATENT DOCUMENTS

| | | | |
|---|---|---|---|
| 4,041,212 A | * 8/1977 | Hewitt | 429/89 |
| 4,752,545 A | * 6/1988 | Brecht et al. | 429/181 |
| 5,885,731 A | * 3/1999 | Shannon et al. | 429/175 |

FOREIGN PATENT DOCUMENTS

| | | | |
|---|---|---|---|
| EP | 0 769 820 A1 | 4/1997 | H01M/2/06 |
| GB | 1475972 | 6/1977 | H01R/5/08 |
| WO | 97/15085 | 4/1997 | H01M/2/30 |

OTHER PUBLICATIONS

Patent Abstract of Japan; vol. 007, No. 243 (E–207) Oct. 28, 1983 and JP58131650.

* cited by examiner

Primary Examiner—Stephen Kalafut
Assistant Examiner—Julian A. Mercado
(74) Attorney, Agent, or Firm—Myers Bigel Sibley & Sajovec

(57) ABSTRACT

A battery and a method of assembly thereof wherein the battery has plates and connecting straps for the plates, all housed within a box with a lid. Formations are provided on the underside of the lid which interfit with corresponding formations on the straps. Sealant is located in a small gap between the formations.

15 Claims, 2 Drawing Sheets

BATTERY

This invention relates to a battery (also known as an accumulator), particularly, but not exclusively, to a battery of the lead-acid type.

In a known battery construction, the positive and negative plates are all connected together to positive and negative terminals respectively by means of connecting straps. The plates are positioned in a box-like container, usually of moulded plastics material, the top of the box being closed by a lid, the terminals projecting through respective apertures in the lid. The lid is sealed to the box and the terminals are sealed within the respective apertures to prevent unwanted escape of fluid e.g. acid or fumes. Two (or the appropriate number) of recesses are formed in the lid and the apertures are formed at the bases of the recesses so that the respective terminals protrude through the apertures into the recesses. When assembling the battery the lid is sealingly connected to the box using a suitable settable material e.g. epoxy resin. Next a seal is placed in the base of each recess to surround the respective terminal and the recess is partially filled with settable sealant so as to cover the seal but leave the upper part of the terminal clear. The construction so formed has the disadvantages that it is complex and its assembly has to be carried out in several stages.

It is an object of the present invention to provide an alternative battery construction and method of assembly which does not suffer from or suffers less from the aforementioned disadvantages.

In accordance with the invention a battery comprises positive and negative plates, two connecting straps, one electrically connected to the positive plates and the other to the negative plates, the plates and straps being enclosed in a box with a lid, two terminals, each one electrically connected to a respective connecting strap, the terminals each projecting through a respective aperture in the lid and surrounded by a seal between the lid and the respective connecting strap, each of which straps has a formation which fits with a corresponding formation on the underside of the lid adjacent the respective aperture with a small gap therebetween, sealant being located in the small gap.

Preferably the formation on the lid and/or the formation on the connecting strap include locating means for the seal, which may be an O-ring. The sealant is preferably seftable and may comprise an epoxy resin.

The lid and the box may be formed with inter-fitting portions e.g. a groove in the lid and a correspondingly shaped edge to the box which may be provided with settable sealant which when fitted together seal the lid to the box. The aforesaid portions on the lid and box and the formations on the connecting straps and the underside of the lid are so constructed and arranged that on bringing the lid and box, which contains the plates and connecting straps, together for closure, the portions and formations fit together simultaneously.

The formations on the lid and/or on the connecting straps preferably include a sealant reservoir so constructed and arranged that on bringing the lid and box, which contains the plates and connecting straps, together for closure sealant is displaced from the reservoir and flows into and fills the small gap. Further preferably the sealant flows around and encapsulates the connecting straps.

In accordance with another aspect of the invention a method of assembling a battery having positive and negative plates, two connecting straps, one electrically connected to the positive plates and the other to the negative plates, the plates and straps being enclosed in a box with a lid, and two terminals, each one protruding through a respective aperture in the lid and being electrically connected to a respective connecting strap comprises the steps of:

providing a formation on each connecting strap, providing a corresponding formation on the underside of the lid adjacent the respective aperture, positioning two seals, one for each terminal, either on the connecting strap or on the underside of the lid, providing sealant on each formation on the lid and/or on each formation on the straps, bringing the lid and box together for closure to cause the formations on the connecting straps to fit with the corresponding formations on the lid and to cause the sealant to flow into and filling a small gap between the formations, and allowing the sealant to set.

Preferably one or each of the formations is formed to include a locating means for the seal which may be an O-ring.

Preferably the method may further comprise the steps of: providing the lid and box with inter-fitting portions, applying a settable sealant thereto, and bringing the lid and box together for closure whereby the portions on the lid and the box and the formations on the connecting straps and the underside of the lid fit together simultaneously.

The method may further comprise the step of providing the formations on each connecting strap and/or the formation on the underside of the lid with a sealant reservoir, supplying the reservoir with sealant and, on bringing the lid and box together for closure, causing the sealant to be displaced from the reservoir and flow into the small gap between the formations. Further preferably, the step of bringing the lid and box together for closure also causes the sealant to flow around and encapsulate each connecting strap.

One embodiment of the invention will now be described by way of example only with reference to the accompanying drawings of which:

Figure 1:
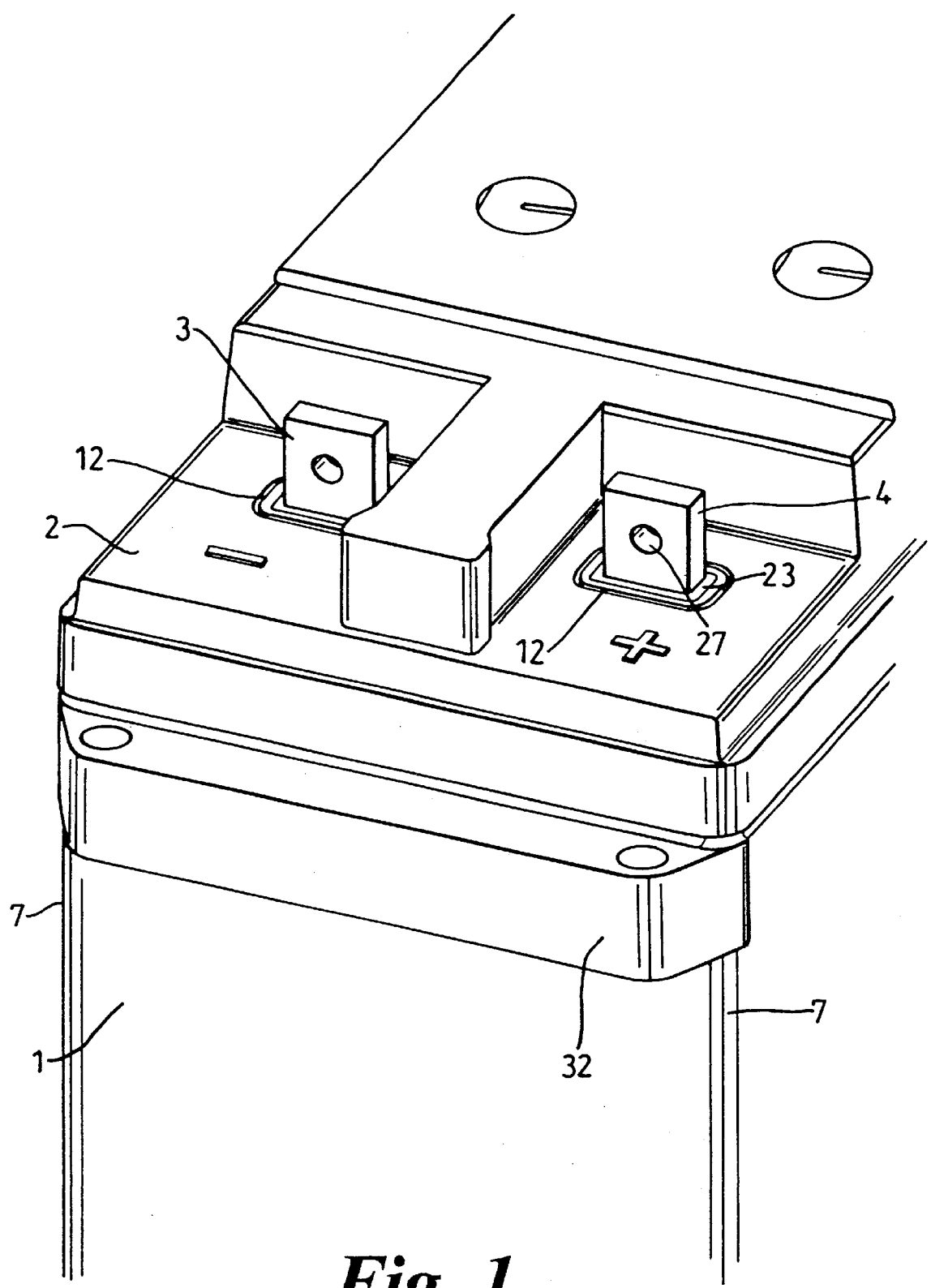
FIG. 1 shows a perspective view of part of a battery in accordance with the invention.

As can be seen in the drawings, a battery according to the invention comprises a box 1, a lid 2, two terminals 3, 4, each one partially embedded in connecting straps 5 (only one shown), and a plurality of electrode plates 6 (only part of one plate shown).

Figure 2:
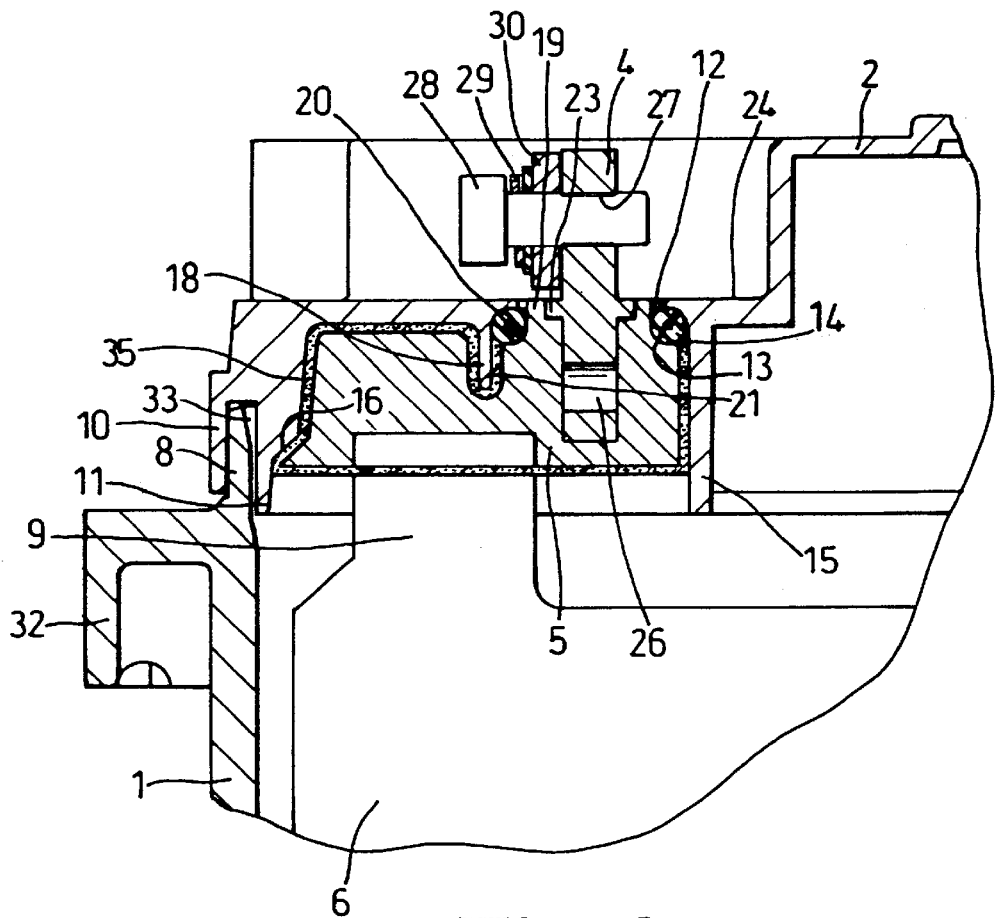
FIG. 2 shows a cross-sectional view through one terminal, one connecting strap and part of the lid and box of the battery shown in FIG. 1.

The box 1 is generally rectangular in shape but with rounded corners 7, having an open top with a peripheral edge 8 to which the lid 2 is secured, and two handles 32, one at each end of the box 1. The box is manufactured by moulding from hard plastics material e.g. ABS or polycarbonate which is inert to acid contained therein, and may be divided into a plurality of chambers by dividing walls of the same hard plastics material, Each chamber containing a plurality of electrode plates, separated by sheets of separator material in a known manner. Each plate has a tag, and the plates of the same polarity in a chamber are arranged with their respective tags in a straight line and are all connected to a respective connecting strap. One plate 6 with one tag 9 is shown in FIG. 2, the tag 9 being partially embedded in the connecting strap 5.

The lid 2 is also moulded from plastics material which may or may not be the same as the material of the box. For example, the lid may be ABS and the box polycarbonate. The lid has portions comprising an outer flange 10 and an inner flange 11 and a groove 33 therebetween around its periphery for receiving the edge 8 of the box. The lid is also moulded so as to have various shaped features (which are not shown) e.g. to receive connecting bars for connecting the plates of like plurality in the same or different chambers, to include a vent means (also not shown) such as a one-way valve to relieve any increase of pressure within the battery, and a filling means by means of which the battery is filled with the appropriate amount of acid.

Figure 3:
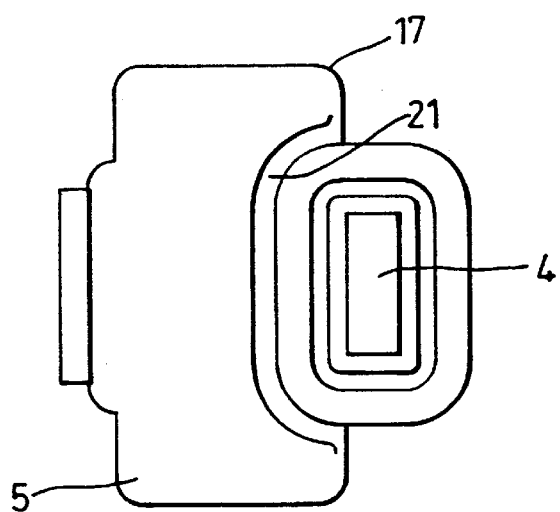
FIG. 3 shows a top plan view of the terminal and part of the connecting strap shown in FIG. 2.

The lid is also moulded to have formations adjacent the two apertures through each of which part of a terminal and connecting strap protrudes. As can be seen particularly in FIG. 1 each aperture 12 is generally rectangular but with rounded corners. As can be seen in FIG. 2 immediately adjacent the aperture 12 along the underside of the lid there is a curved shoulder 13 for receiving an O-ring seal 14. Immediately adjacent the shoulder 13 is a flange 15 which projects downwards into the interior of the battery and surrounds the connecting strap, following the boundary 17 of the strap as shown in FIG. 3, except where the strap abuts part of the side of the lid indicated by reference numeral 16. A narrow ridge 18 shorter than the flange 15 projects into the space bounded by the flange 15, the ridge 18 following the groove 21 in the strap and merging at its ends with the flange 15. When the lid is inverted a reservoir is formed between the lid (the reservoir base), the ridge 18, the lid side 16 and parts of the flange 15.

The connecting strap 5, made of lead for a lead-acid battery, has an upper surface shaped to be generally complementary to the shape of the underside of the lid 2. Thus the strap 5 has a generally rectangular region 19 with rounded edges (see FIG. 3) which fits into the aperture 12 in the lid 2. Immediately adjacent the rectangular region 19 is a ledge 20 for supporting the O-ring 14, the ledge generally facing the shoulder 13. Adjacent the ledge 20 is the groove 21 receiving the ridge 18 formed on the lid. A small gap is provided between the groove 21 and the upper surfaces on the strap and the corresponding flanges 15 and 18 and the underside of the lid 2. The small gap is filled with sealant 35, which also surrounds and encapsulates the connecting strap as shown in FIG. 2.

The terminal 4, made of copper or copper alloy such as brass, comprises a generally rectangular block with a centrally disposed projecting member 23. The upper side of the member 23 lies level with the top of the rectangular region 19 of the connecting strap and may also be level with the upper surface 24 of the lid adjacent the aperture 12, although not necessarily so. The main part of the member 23 and the lower part of the terminal 4 is embedded within the connecting strap 5. The lower part of the terminal has a hole 26 which is filled with some of the lead of the connecting strap 5. The upper part of the terminal is provided with a screw-threaded hole 27 for receiving a bolt 28. A spring washer 29 and a plain washer 30 are also provided so that the end component of an electrical cable can be secured to the terminal 4, between the plain washer 30 and the terminal 4 with minimum electrical resistance.

To assemble the battery shown in the drawings, the plates 6 and the separators (not shown) are assembled in side-by-side arrangement, compressed (the separating material being compressible), and positioned as required in the chambers in the box 1. However the assemblies of plates and separators are not pushed fully into the chambers but are left with the tags 9 lying above the level of the edge 8 of the box 1. The box 1 and assemblies are then inverted and placed above a mould so that the tags 9 extend downwards into mould cavities where appropriate terminals 4 are already positioned in the base of the cavities. Molten lead is then fed into the cavities to surround the tags 9 and the lower parts of the terminals 4, entering the holes 26 in the lower parts of the terminals. The lead is allowed to cool and solidify so that the tags are partially embedded in the lead and the terminals 4, straps 5 and plates 6 are in the required positions. The box is then turned the correct way up and the assemblies of plates and separators are pushed fully into the chambers, the straps and terminals moving with the assemblies.

The lid is inverted and liquid epoxy resin sealant is poured into the reservoirs bounded by the lid side 16, the ridge 18 and parts of the flange 15 and also into the groove 33 at the edge of the lid. The O-rings 14 are placed in position on the straps 5 against the shoulders 20 to surround the terminals 19. The box 1 and its contents are also inverted and lowered on to the inverted lid. As the box is lowered the edge 8 of the box enters and mates with the groove 33 between the flanges 10 and 11 and the various formations on the underside of the lid engaged with correspondingly-shaped formations on the strap 5, the ridge 18 entering the groove 21 on the upper surface of the strap 5. The O-ring 14 is compressed between the ledge 20 on the strap and the shoulder 13 on the underside of the lid. The sealant in the reservoir is displaced by part of the strap and flows over the ridge 18 into the small gap between the upper surface of the strap and underside of the lid within the overall space bounded by the flange 15 and the lid side 16. The small gap is filled, the O-ring 20 is covered and the connecting strap surrounded by a thin film of sealant 35.

The settable sealant is allowed to set, the whole assembly turned the correct way up and a required amount of battery acid is fed into the box via filling means in the lid. The filling means is then closed by a vent cap.

What I claim is:

1. A battery comprising positive and negative plates, two connecting straps, one electrically connected to the positive plates and the other to the negative plates, the plates and straps being enclosed in a box with a lid, two terminals, each one electrically connected to a respective connecting strap, the terminals each projecting through a respective aperture in the lid and surrounded by a seal between the lid and the respective connecting strap, each of which straps has an upper surface formation which fits with a corresponding formation on the underside of the lid adjacent the respective aperture with a gap therebetween, sealant being located in the gap.

2. The battery according to claim 1 wherein the formation on the lid and/or the formation on the connecting strap include locating means for the seal.

3. The battery according to claim 1 wherein the seal is an O-ring seal.

4. The battery according to claim 1 wherein the sealant is settable.

5. The battery according to claim 1 wherein the sealant is an epoxy resin.

6. The battery according to claim 1 wherein the lid and the box are formed with inter-fitting portions provided with sealant which seals the lid to the box.

7. The battery according to claim 6 wherein the portions on the lid and the box and the formations on the connecting straps and the underside of the lid are so constructed and arranged that on bringing the lid and box, which contains the plates and connecting straps, together for closure, the portions and formations fit together simultaneously.

8. A battery according to claim 1 wherein one of the formations on the lid and the formations on the connecting straps includes a sealant reservoir so constructed and arranged that on bringing the lid and box which contains the plates and connecting straps together for closure, sealant is displaced from the reservoir and flows into and fills the gap.

9. A battery according to claim 1 wherein the formations on the lid and/or on the connecting strap includes a sealant reservoir so constructed and arranged that on bringing the lid and box which contains the plates and connecting straps together for closure, sealant is displaced from the reservoir and flows into and fills the gap and also flows around and encapsulates the connecting straps.

10. A method of assembling a battery having positive and negative plates, two connecting straps, one electrically connected to the positive plates and the other to the negative plates, the plates and straps being enclosed in a box with a lid, and two terminals each one protruding through a respective aperture in the lid and being electrically connected to a respective connecting strap comprising the steps of:

provided an upper surface formation on each connecting strap, providing a corresponding formation on the underside of the lid adjacent the respective aperture, positioning two seals, one for each terminal, either on the connecting strap or on the underside of the lid, providing sealant on each formation on the lid and/or on each formation on the straps, bringing the lid and box together for closure to cause the formations on the connecting straps to fit with the corresponding formations on the lid and to cause the sealant to flow into and fill a gap between the formations, and allowing the sealant to set.

11. A method according to claim 10 wherein one or each of the formations is formed to include a locating means for the seal.

12. The method according to claim 10 further comprising the steps of providing the lid and box with inter-fitting portions, applying a seftable sealant thereto, and bringing the lid and box together for closure whereby the portions on the lid and the box and the formations on the connecting straps and the underside of the lid fit together simultaneously.

13. A method according to claim 10 further comprising the steps of providing the formations on each connecting strap and the formation on the underside of the lid adjacent each aperture with a sealant reservoir, supplying the reservoir with sealant and, on bringing the lid and box together for closure, causing the sealant to be displaced from the reservoir and flow into the gap between the formations.

14. The method according to claim 13 wherein the step of bringing the lid and box together for closure also causes the sealant to flow around and encapsulate each connecting strap.

15. A battery, comprising:

positive and negative plates;

two connecting straps, one of which is electrically connected to the positive plates and the other of which is connected to the negative plates;

a box with a lid enclosing said plates and straps;

two terminals, each one electrically connected to a respective connecting strap, the terminals each projecting through a respective aperture in the lid;

a O-ring seal between the lid and the respective connecting strap surrounding each terminal;

wherein each of the straps has an upper surface formation which fits with a corresponding formation on the underside of the lid adjacent the respective aperture with a gap therebetween; and settable sealant being located in the gap.

\* \* \* \* \*